(12) United States Patent
Liu (10) Patent No.: US 12,116,069 B1
(45) Date of Patent: Oct. 15, 2024

(54) BICYCLE RACK

(71) Applicant: Yao-Huang Liu, Tainan (TW)

(72) Inventor: Yao-Huang Liu, Tainan (TW)

( * ) Notice: Subject to any disclaimer, the term of this patent is extended or adjusted under 35 U.S.C. 154(b) by 0 days.

(21) Appl. No.: 18/481,601

(22) Filed: Oct. 5, 2023

(51) Int. Cl.
  *B62H 3/06* (2006.01)

(52) U.S. Cl.
  CPC ..................... *B62H 3/06* (2013.01)

(58) Field of Classification Search
  CPC ... B62H 3/00; B62H 3/02; B62H 3/04; B62H 3/06; B62H 3/08; B62H 3/10; B62H 3/12; B62H 2700/00; B60R 9/10
  See application file for complete search history.

(56) References Cited

U.S. PATENT DOCUMENTS

| | | | | |
|---|---|---|---|---|
| 3,883,002 A | * | 5/1975 | Moore | B62H 3/08 |
| | | | | 211/21 |
| 3,907,113 A | * | 9/1975 | Kropelnitski | B62H 3/12 |
| | | | | 414/227 |
| 4,114,764 A | * | 9/1978 | Rich | A47F 7/26 |
| | | | | 211/171 |
| 5,054,628 A | * | 10/1991 | Allen | B62H 3/12 |
| | | | | 211/100 |
| 5,294,006 A | * | 3/1994 | Deschino | A47F 5/0853 |
| | | | | 211/5 |
| 5,332,104 A | * | 7/1994 | Santella | B62H 3/02 |
| | | | | 211/99 |
| 5,474,189 A | * | 12/1995 | Peterson | B62H 3/12 |
| | | | | 211/96 |
| 5,553,718 A | * | 9/1996 | Robar | B62H 3/00 |
| | | | | 224/924 |
| 5,642,820 A | * | 7/1997 | Angeles | B62H 3/06 |
| | | | | 211/103 |
| 6,302,278 B1 | * | 10/2001 | Dueck | A47F 7/00 |
| | | | | 211/104 |
| 6,691,878 B1 | * | 2/2004 | Ouitz | A47B 97/00 |
| | | | | 211/104 |
| 7,055,725 B1 | * | 6/2006 | Kolda | B60R 9/10 |
| | | | | 224/924 |

(Continued)

FOREIGN PATENT DOCUMENTS

| CA | 2158893 C | * 11/2005 | ............... A47F 7/00 |
|---|---|---|---|
| CA | 3133274 C | * 10/2023 | ............... A47F 5/06 |

(Continued)

*Primary Examiner* — Patrick D Hawn
(74) *Attorney, Agent, or Firm* — Demian K. Jackson; Jackson IPG PLLC (57) ABSTRACT

A bicycle rack contains a fixing rod, a positioning seat, a hanging frame, and two connection assemblies. The fixing rod is fixed on a wall. The positioning seat includes two locating sets, and a respective one positioning set has a hanging protrusion and an accommodation protrusion. An end of the hanging frame is rotatably connected with the fixing rod and is forced by an external force to swing between a hanging position and a storage position reciprocate. The two connection assemblies are rotatably connected between the positioning seat and the hanging frame. A respective one connection assembly includes an upper joining post and a lower joining post, and the upper joining post has a locating orifice. The lower joining post is rotatably connected with the hanging frame, the upper joining post is rotatably connected with the lower joining post, and the lower joining post has an abutting portion.

12 Claims, 9 Drawing Sheets

(56) References Cited

U.S. PATENT DOCUMENTS

| | | | |
|---|---|---|---|
| 7,225,933 B1 * | 6/2007 | Pollock | B62H 3/12 211/171 |
| 7,419,076 B1 * | 9/2008 | Grothues | B60R 9/06 224/533 |
| 7,766,202 B2 * | 8/2010 | Depot | B60R 9/06 224/519 |
| 7,854,331 B2 * | 12/2010 | Ouyang | B62H 3/12 211/18 |
| 8,556,144 B2 * | 10/2013 | Liu | B60R 9/10 224/532 |
| 9,056,640 B2 * | 6/2015 | Vineyard | B62H 3/06 |
| 9,504,322 B1 * | 11/2016 | McJunkin | B62H 3/12 |
| 10,111,543 B2 * | 10/2018 | Terragni | A47G 25/0685 |
| 10,183,627 B1 * | 1/2019 | Liu | B60R 9/06 |
| 10,611,421 B2 * | 4/2020 | Rauba | B62H 3/12 |
| 11,780,518 B1 * | 10/2023 | Ho | B62H 3/08 211/19 |
| 11,851,124 B1 * | 12/2023 | Ricketts | B62H 3/02 |
| 11,964,721 B1 * | 4/2024 | Liu | B62H 3/10 |
| 2005/0056740 A1 * | 3/2005 | Chuang | B62H 3/12 248/176.1 |
| 2010/0320247 A1 * | 12/2010 | Wang | B60R 9/10 224/567 |
| 2023/0415836 A1 * | 12/2023 | Cooney | B62H 3/02 |

FOREIGN PATENT DOCUMENTS

| | | | | |
|---|---|---|---|---|
| CZ | 37236 U1 * | 8/2023 | | B62H 3/12 |
| DE | 4119403 A1 * | 12/1992 | | B62H 3/04 |
| DE | 19703157 A1 * | 7/1998 | | B60R 9/06 |
| DE | 102020004491 A1 * | 1/2022 | | |
| DE | 202021106764 U1 * | 5/2022 | | B62H 3/12 |
| DE | 202022104215 U1 * | 9/2022 | | B62H 3/12 |
| EP | 0940330 A1 * | 9/1999 | | B62H 3/12 |
| FR | 3125839 A3 * | 2/2023 | | |
| KR | 20100008367 U * | 8/2010 | | B62H 3/08 |
| KR | 200484318 Y1 * | 8/2017 | | B62H 3/06 |
| TW | M622561 U * | 1/2022 | | |
| TW | M648531 U * | 11/2023 | | |
| WO | WO-2011146996 A1 * | 12/2011 | | B62H 3/04 |

* cited by examiner

BICYCLE RACK

TECHNICAL FIELD

The present invention relates to bicycle accessories, and more particularly to a bicycle rack.

BACKGROUND

A conventional bicycle rack is fixed on a wall to hang a bicycle. Such a conventional bicycle rack is retracted upward to decrease its size and is retracted downward to hang the bicycle by sliding and positioning a holder and a vertical rod. However, a structure of the holder is complicated, and the holder and the vertical rod are slid and positioned to cause excessive components and high fabrication cost, and the conventional bicycle rack is connected time-consumingly and laboriously. Also, a service life of the conventional bicycle rack is quite short and is broken easily.

The present invention has arisen to mitigate and/or obviate the afore-described disadvantages.

SUMMARY

The primary aspect of the present invention is to provide a bicycle rack which is produced at a low cost and is operated easily. Also, a strength of the bicycle rack is enhanced and increases a service life of the bicycle rack.

To obtain the above-mentioned aspects, a bicycle rack provided by the present invention contains a fixing rod, a positioning seat, a hanging frame, and two connection assemblies.

The fixing rod is configured to be fixed on a wall.

The positioning seat is connected to the fixing rod, and the positioning seat includes two locating sets formed on two sides of the positioning seat. A respective one positioning set has a hanging protrusion and an accommodation protrusion.

An end of the hanging frame is rotatably connected with the fixing rod and is forced by an external force to swing between a hanging position and a storage position reciprocate.

The two connection assemblies are rotatably connected among two opposite sides of the positioning seat and two opposite sides of the hanging frame. A respective one connection assembly includes an upper joining post and a lower joining post, a top of the upper joining post is rotatably connected with the positioning seat, the upper joining post has a locating orifice, a bottom of the lower joining post is rotatably connected with the hanging frame, a bottom of the upper joining post is rotatably connected with a top of the lower joining post, and the lower joining post has an abutting portion extending curvedly outward from a top thereof.

When the hanging frame is located at a hanging position, the hanging protrusion of the positioning seat is received in the locating orifice of the respective one connection assembly, and the abutting portion abuts against the lower joining post; when the hanging frame is located at a storage position, the accommodation protrusion of the positioning seat is received in the locating orifice of the respective one connection assembly.

DETAILED DESCRIPTION

With reference to FIGS. 1-9, a bicycle rack 100 according to a preferred embodiment of the present invention comprises a fixing rod 10, a positioning seat 20, a hanging frame 30, two connection assemblies 40, and two resilient sheets 50.

Referring to FIGS. 1 to 5, the fixing rod 10 includes a top holder 11, a bottom holder 12, and a coupling post 13. The top holder 11 is configured to be fixed on a wall, and the bottom holder 12 is configured to be mounted on the wall and located under the top holder 11, wherein the coupling post 13 is erected and is rotatably connected between the top holder 11 and the bottom holder 12 so as to be forced by an external force to rotate at an original position, wherein the coupling post 13 has a through orifice 131 passing therethrough.

Referring to FIGS. 1-5, the positioning seat 20 includes a body 21 and a passing stem 22. The body 21 has a receiving orifice 211 passing therethrough, a hole 212 passing through two sides thereof, and two locating sets 213 formed on two sides of the hole 212, wherein a respective one locating set 213 has a hanging protrusion 214 and an accommodation protrusion 215, wherein the hanging protrusion 214 is located beside the hole 212, and the accommodation protrusion 215 is located above the hole 212, wherein the hanging protrusion 214 and the accommodation protrusion 215 have an arcuate face. The passing stem 22 passes through the hole 212 of the body 21 and the through orifice 131 of the coupling post 13 so as to connect the body 21 and the coupling post 13.

As shown in FIGS. 1-4, the hanging frame 30 is formed in an elongated oval shape, wherein an end of the hanging frame 30 is rotatably connected with an outer surface of a bottom of the coupling post 13 of the fixing rod 10 and is forced by the external force to swing between a hanging position and a storage position.

Referring to FIGS. 1 to 4, the two connection assemblies 40 are rotatably connected among two opposite sides of the positioning seat 20 and two opposite sides of the hanging frame 30. A respective one connection assembly 40 includes an upper joining post 41, a lower joining post 42, and a connector 43, wherein a top of the upper joining post 41 is rotatably connected with the passing stem 22 of the positioning seat 20, the upper joining post 41 has a locating orifice 411, a bottom of the lower joining post 42 is rotatably connected with the hanging frame 30, the lower joining post 42 has an abutting portion 421 extending curvedly outward from a top thereof, and the lower joining post 42 has a defining orifice 422 defined thereon, wherein the connector 43 is connected between a bottom of the upper joining post 41 and the top of the lower joining post 42, and the connector 43 has an expanding protrusion 431 and a retracting protrusion 432, wherein the expanding protrusion 431 and a retracting protrusion 432 have an arcuate face so that the two connection assemblies 40 are rotatably connected between the positioning seat 20 and the hanging frame 30 to fix the hanging frame 30 on the hanging position and the storage position.

As shown in FIGS. 1 to 4, an end of a respective one resilient sheet 50 is connected on an inner wall of the upper joining post 41 of the respective one connection assembly 40, and the other end of the upper joining post 41 of the respective one connection assembly 40 bends inward.

Figure 2:
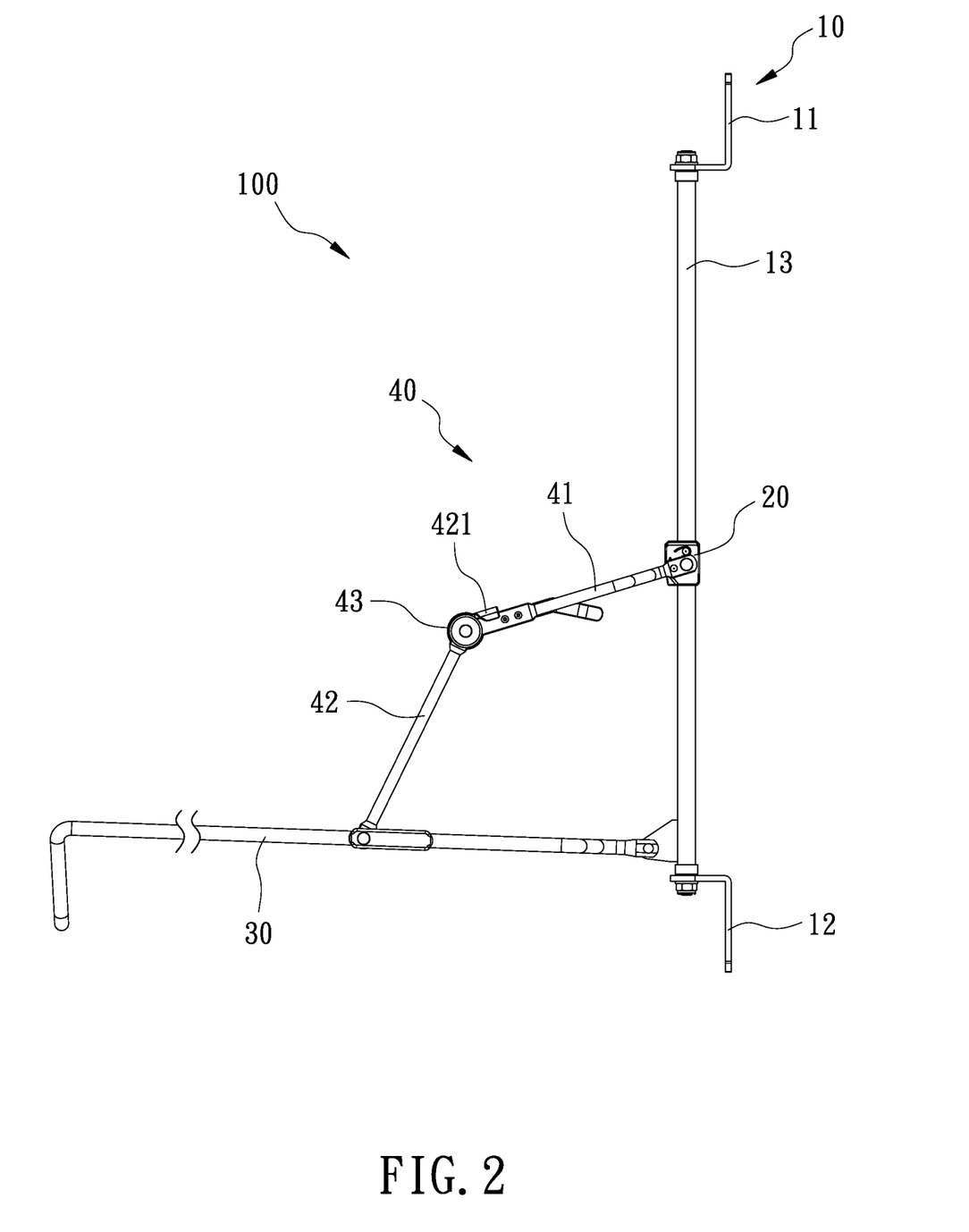
FIG. 2 is a side plan view showing the assembly of the bicycle rack at the hanging position according to the preferred embodiment of the present invention.
Figure 3:
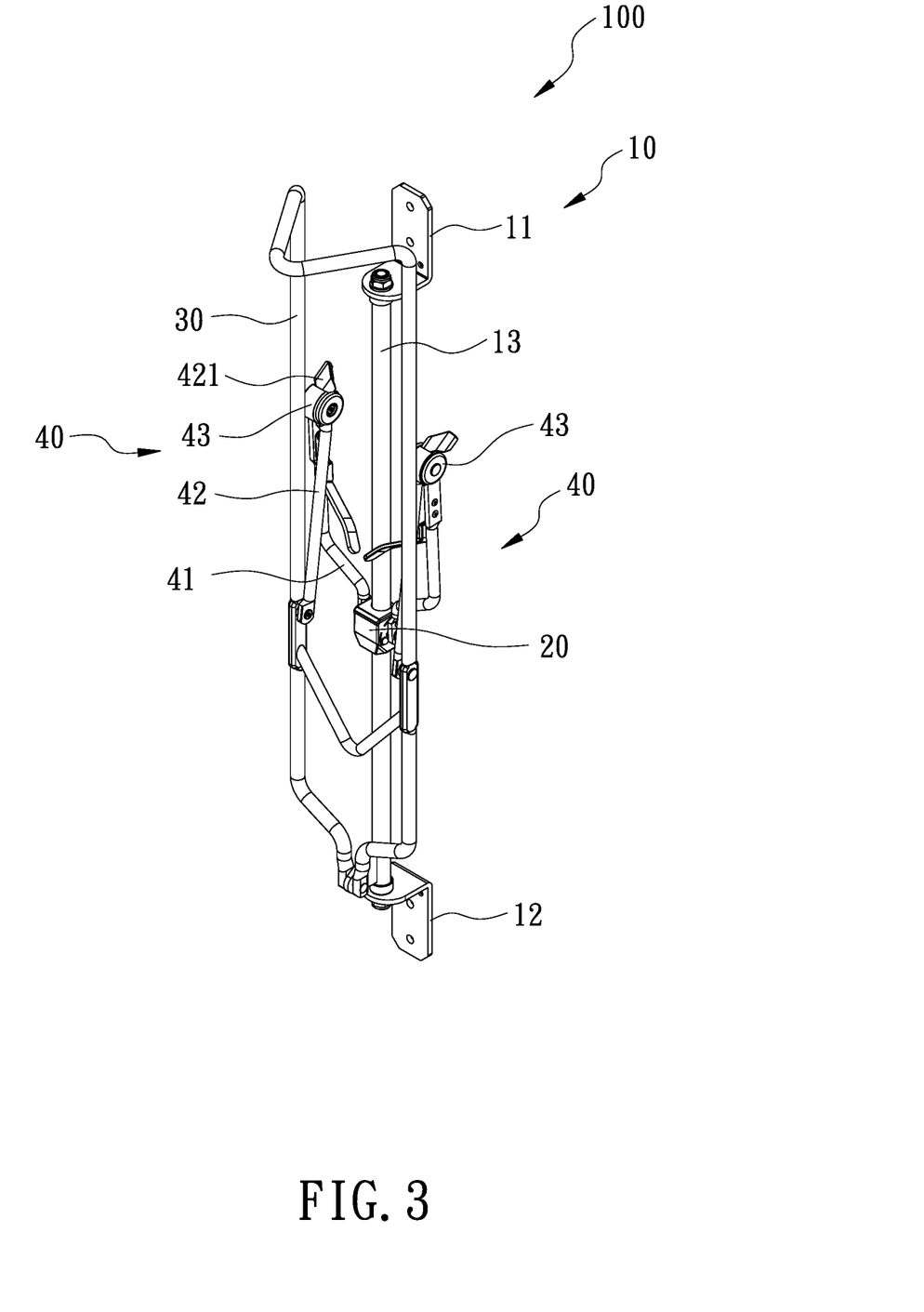
FIG. 3 is a perspective view showing the assembly of the bicycle rack at a storage position according to the preferred embodiment of the present invention.
Figure 6:
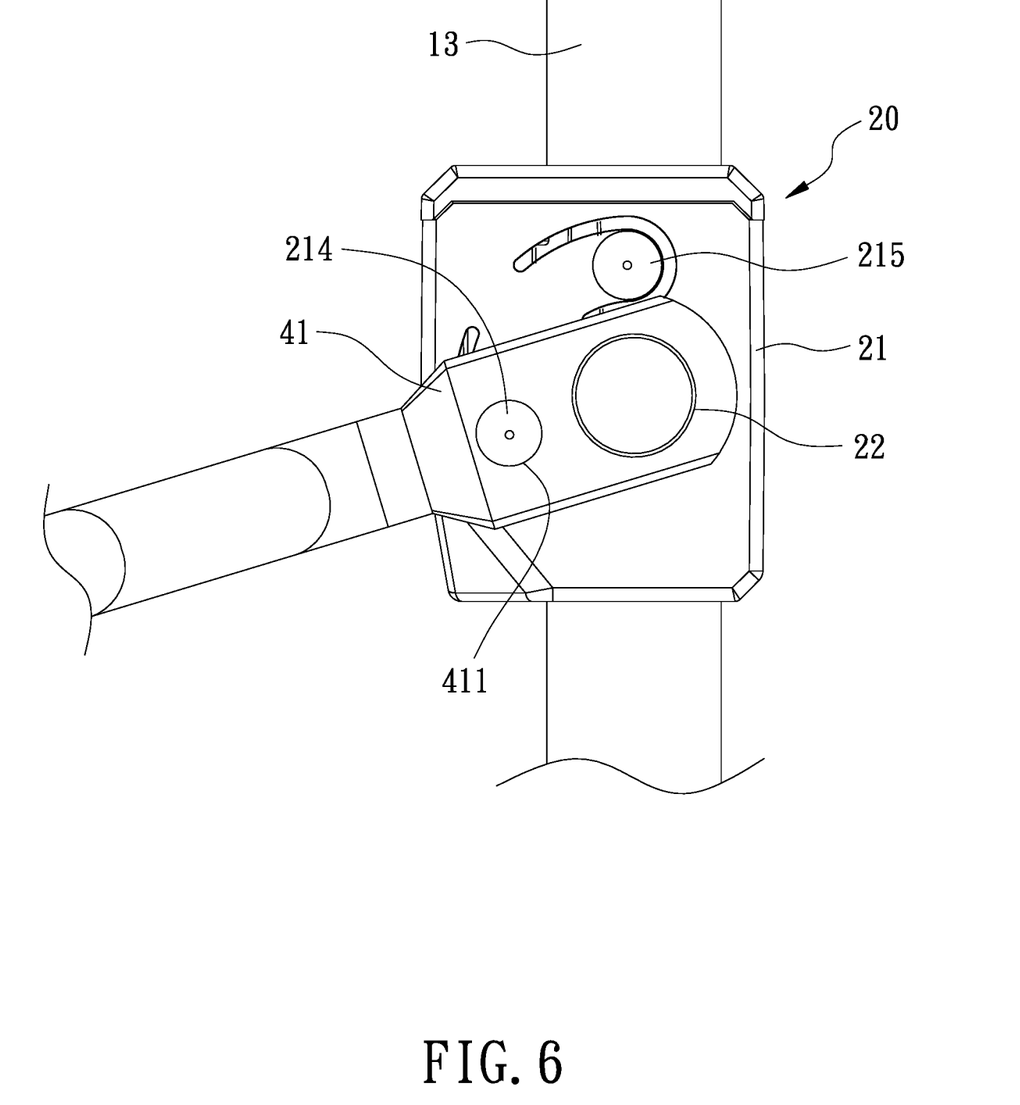
FIG. 6 is a side plan view showing the operation of the bicycle rack according to the preferred embodiment of the present invention.
Figure 8:
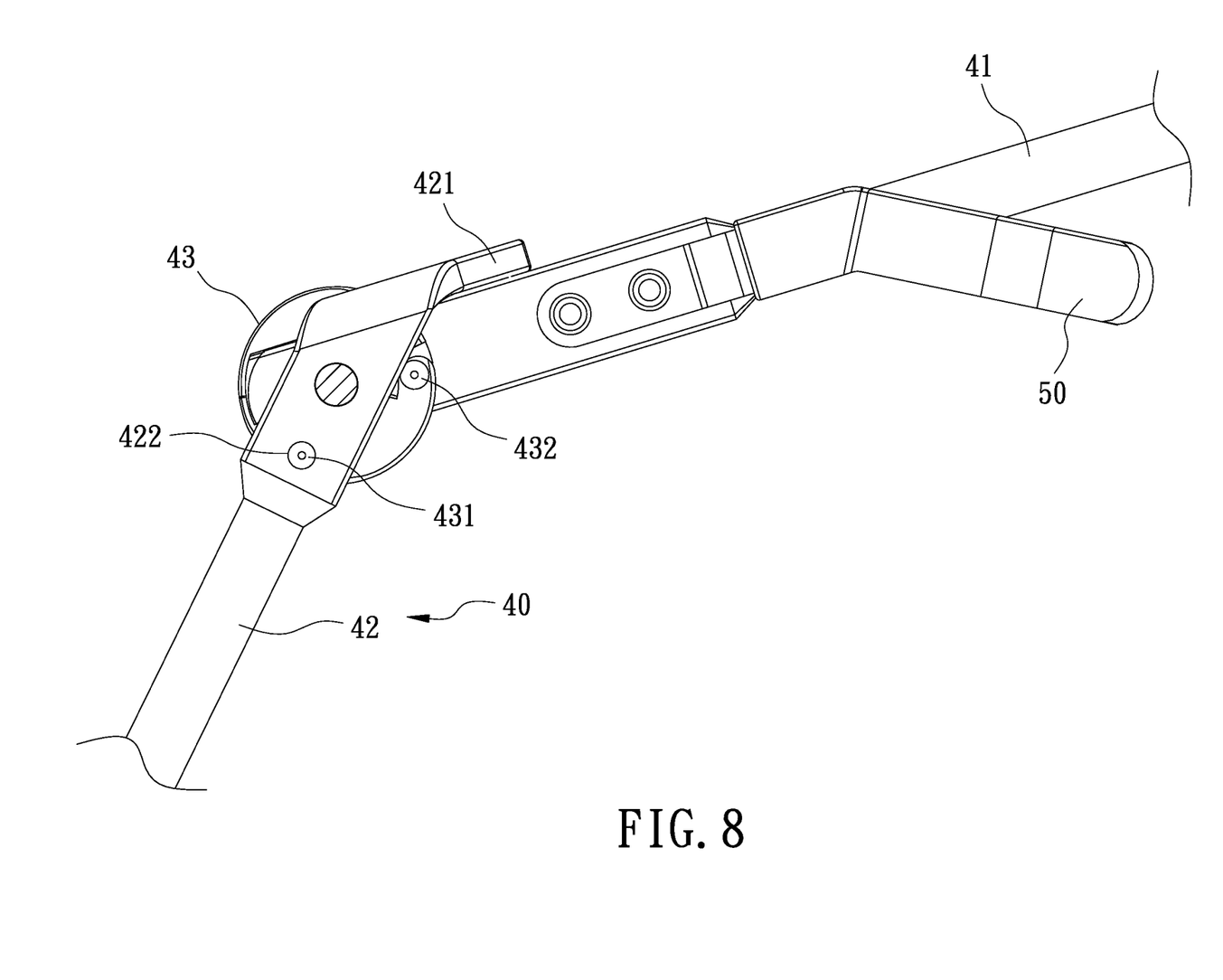
FIG. 8 is also another side plan view showing the operation of the bicycle rack according to the preferred embodiment of the present invention.

When desiring to hang a bicycle on the bicycle rack 100, a user grips the hanging frame 30 and rotates the hanging frame 30 downward to the hanging position. In the meantime, the hanging frame 30 actuates the two connection assemblies 40 to rotate and expand so that the locating orifice 411 of the upper joining post 41 removes from the accommodation protrusion 215 of the positioning seat 20 and rotatably moves to the hanging protrusion 214, thus sliding the hanging protrusion 214 into the locating orifice 411, as shown in FIG. 6. When the hanging frame 30 rotates downward, the defining orifice 422 of the lower joining post 42 removes from the retracting protrusion 432 of the connector 43 and rotatably moves to the expanding protrusion 431 so that the expanding protrusion 431 slides into the defining orifice 422, as shown in FIG. 8, and the upper joining post 41 and the lower joining post 42 are limited and expand, hence the hanging frame 30 is fixed and hung horizontally, as shown in FIG. 2, thus putting a front wheel of the bicycle (not shown) to hang the bicycle.

In the meantime, the front wheel of the bicycle is flexibly pressed by the two resilient sheets 50 to reduce a vibration of the bicycle. Preferably, the two resilient sheets 50 are applicable for various sizes of bicycles to abut against the various sizes of bicycles stably.

Figure 4:
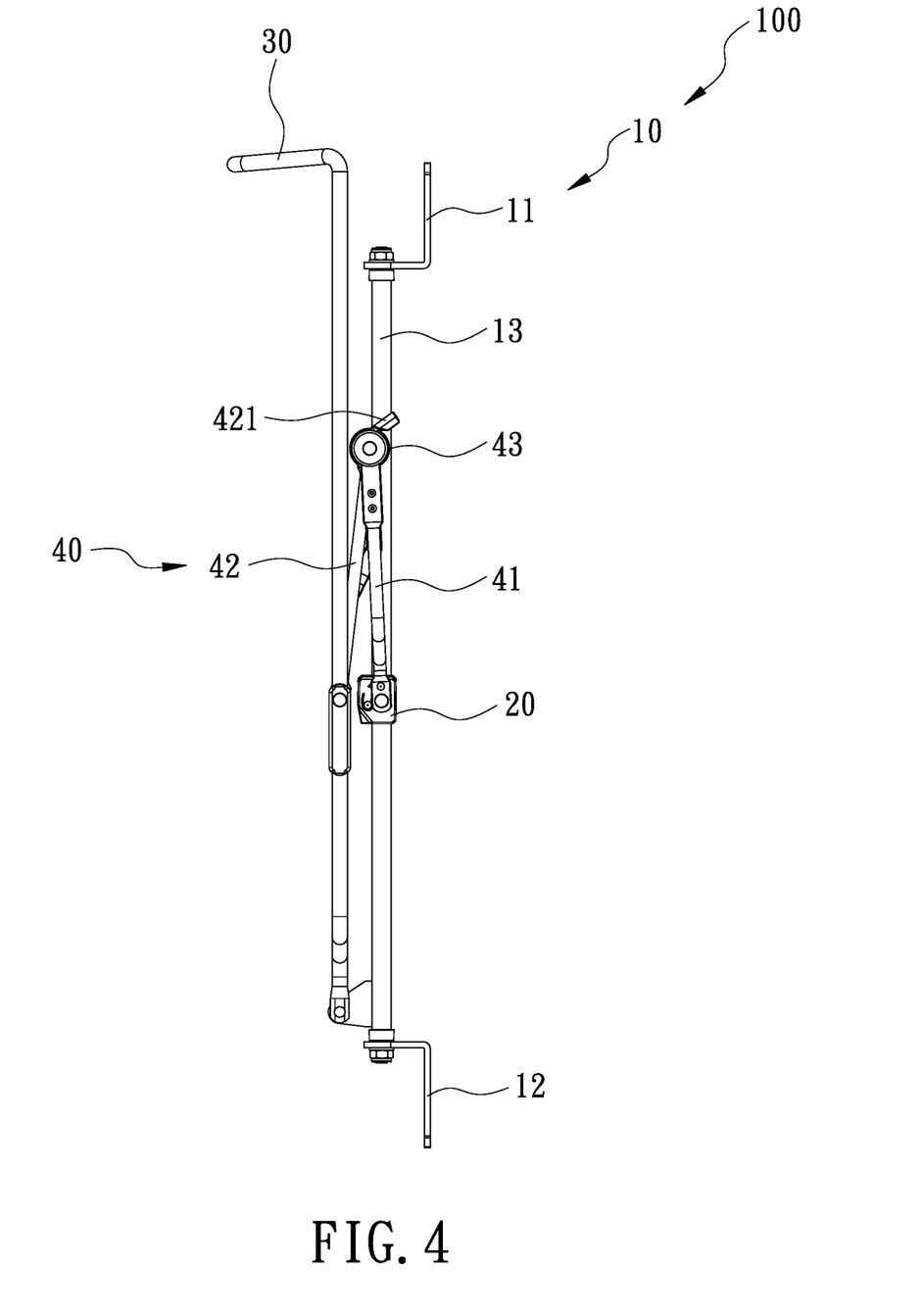
FIG. 4 is a side plan view showing the assembly of the bicycle rack at the storage position according to the preferred embodiment of the present invention.
Figure 5:
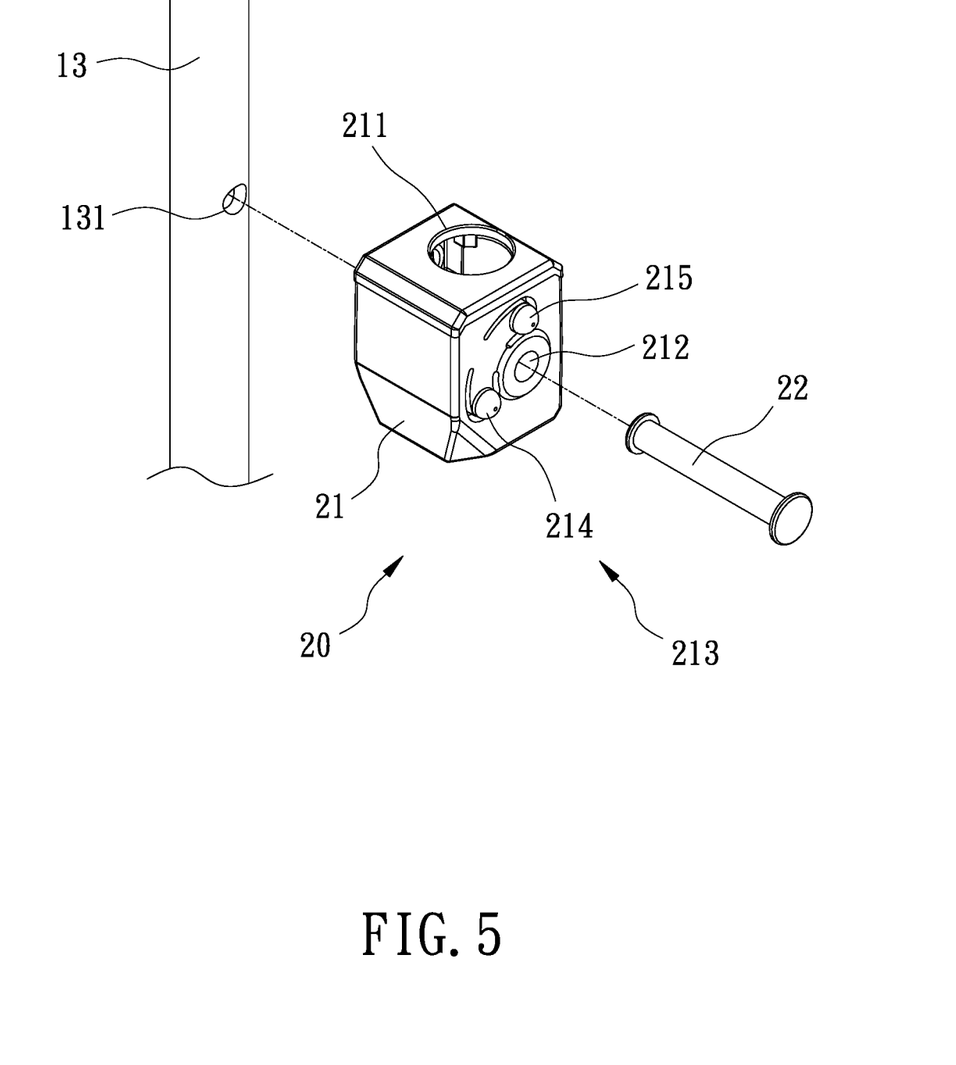
FIG. 5 is a perspective view of a part of FIG. 1 according to the preferred embodiment of the present invention.
Figure 7:
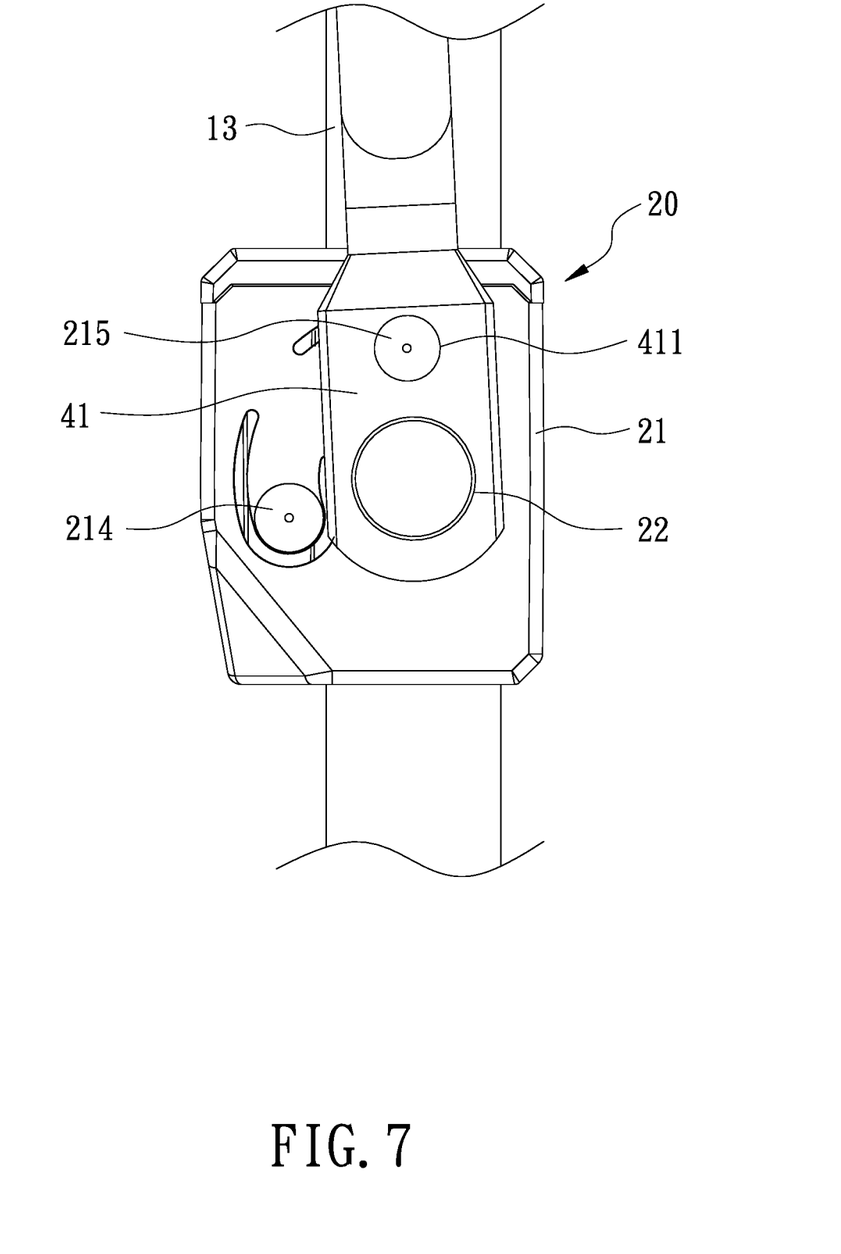
FIG. 7 is another side plan view showing the operation of the bicycle rack according to the preferred embodiment of the present invention.
Figure 9:
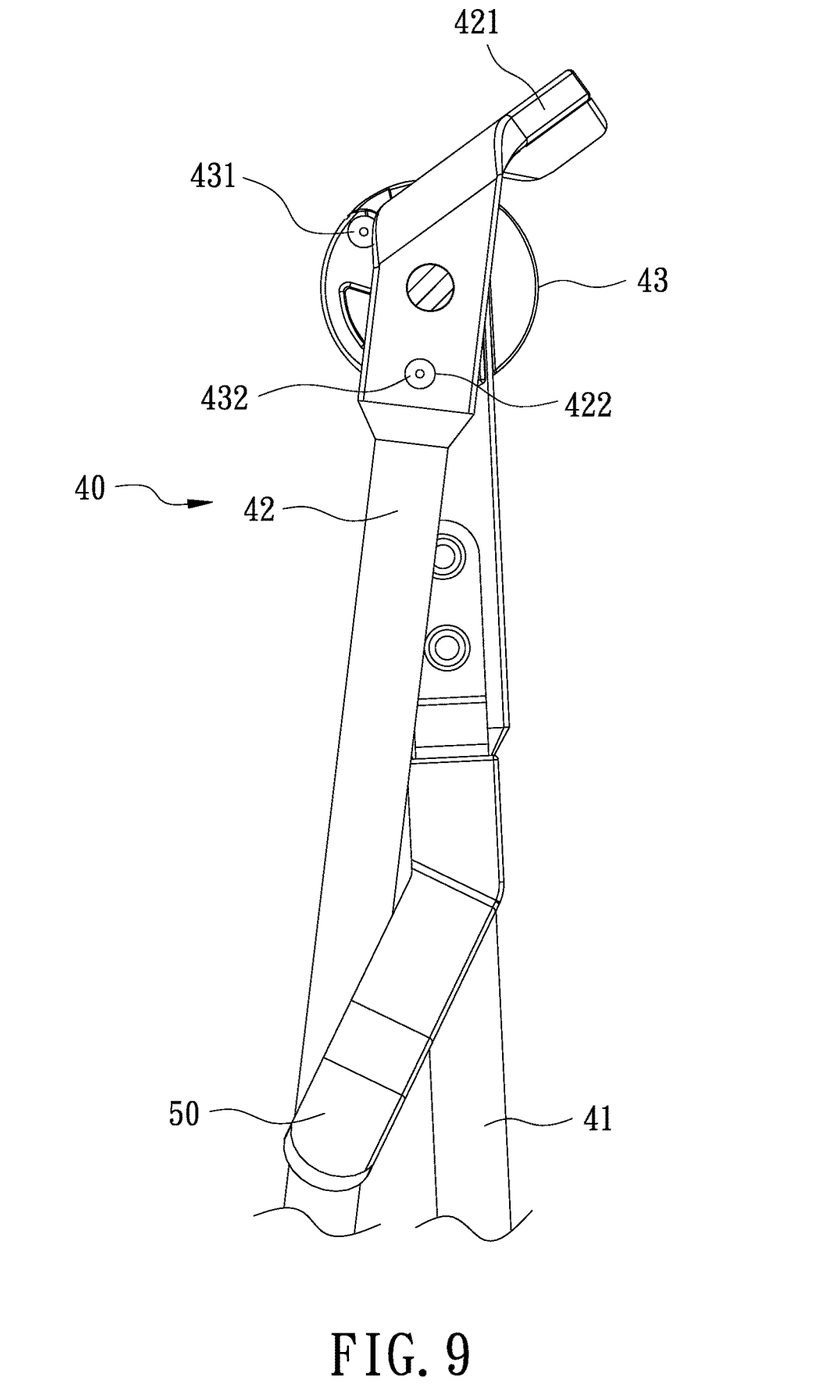
FIG. 9 is still another side plan view showing the operation of the bicycle rack according to the preferred embodiment of the present invention.

When not desiring to hang the bicycle, the user grips the hanging frame 30 directly to rotate the hanging frame 30 upward to the storage position, and the hanging frame 30 actuates the two connection assemblies 40 to rotate and retract, such that the locating orifice 411 of the upper joining post 41 removes from the hanging protrusion 214 of the positioning seat 20 and rotatably moves to the accommodation protrusion 215 so that the accommodation protrusion 215 slides into the locating orifice 411 as illustrated in FIG. 7, and when the hanging frame 30 rotates upward, the defining orifice 422 of the lower joining post 42 removes from the expanding protrusion 431 of the connector 43 and rotatably moves to the retracting protrusion 432 so that the retracting protrusion 432 slides into the defining orifice 422, as shown in FIG. 9, and the upper joining post 41 and the lower joining post 42 are limited and retract, hence the hanging frame 30 is fixed on the storage position and is erected upright, as illustrated in FIG. 4, thus reducing a size of hanging the bicycle.

Thereby, the bicycle rack is simplified and is produced and connected at a low cost. Also, the bicycle rack is operated easily by the user.

Figure 1:
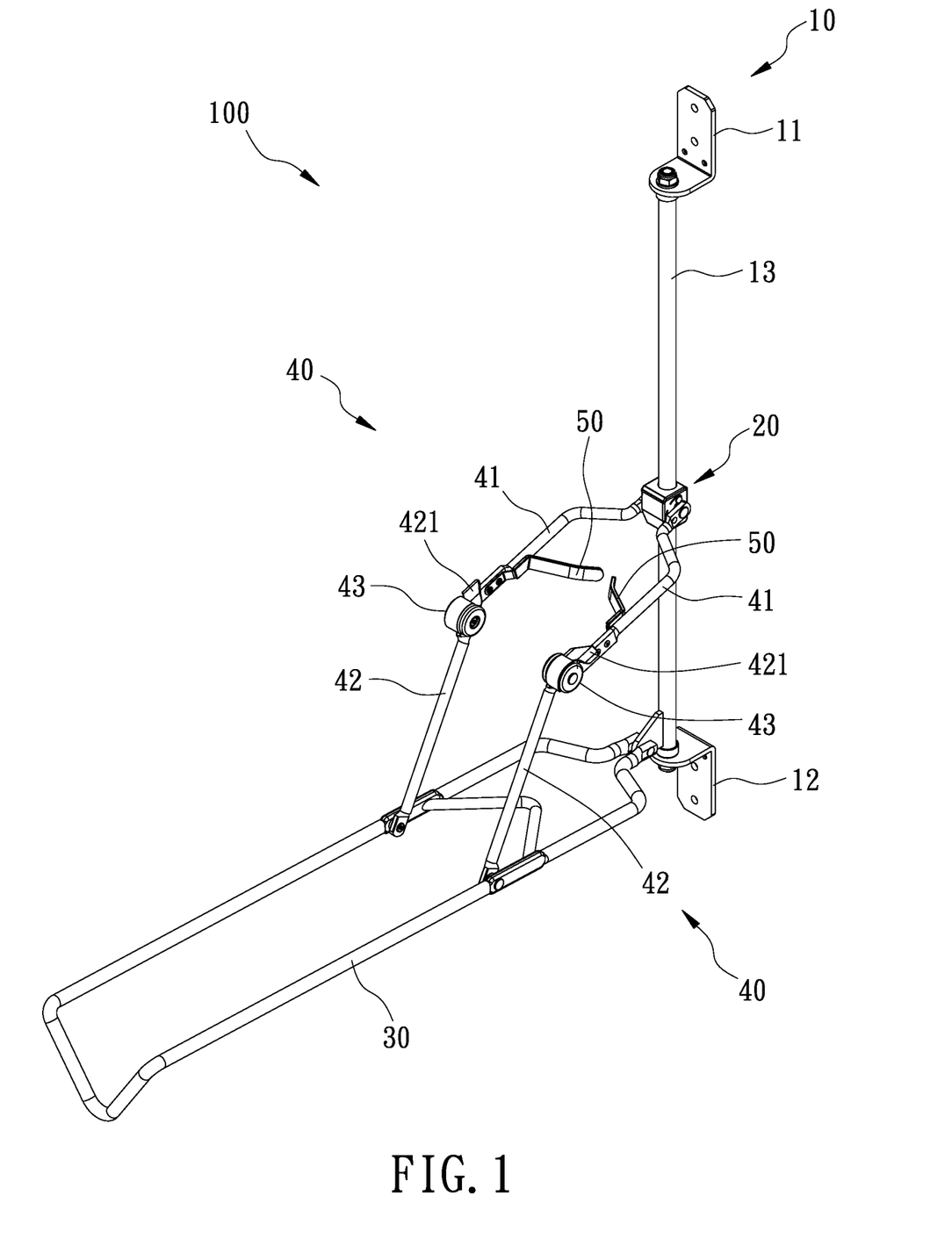
FIG. 1 is a perspective view showing the assembly of a bicycle rack at a hanging position according to a preferred embodiment of the present invention.

When the bicycle rack is located on the hanging position, the abutting portion 421 of the lower joining post 42 of the respective one connection assembly 40 abuts against the upper joining post 41, as shown in FIGS. 1 and 2, such that a strength of the bicycle rack is enhanced to increase a loading capacity and a service life of the bicycle and to reduce a damage probability of the bicycle.

The hanging protrusion 214 and the accommodation protrusion 215 of the respective one locating set 213 have an arcuate face to facilitate an inward and outward sliding of the locating orifice 411. Also, the expanding protrusion 431 and the retracting protrusion 432 of the connector 43 have the arcuate face to facilitate an inward and outward sliding of the defining orifice 422. The hanging protrusion 214, the accommodation protrusion 215, the expanding protrusion 431 and the retracting protrusion 432 are resilient to facilitate the inward and the outward sliding.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:
1. A bicycle rack comprising:
a fixing rod configured to fix on a wall;
a positioning seat connected to the fixing rod, and the positioning seat including two locating sets formed on two sides of the positioning seat, wherein a respective one positioning seat has a hanging protrusion and an accommodation protrusion;
a hanging frame, an end of the hanging frame being rotatably connected with the fixing rod and being forced by an external force to swing between a hanging position and a storage position;
two connection assemblies rotatably connected among two opposite sides of the positioning seat and two opposite sides of the hanging frame, wherein a respective one connection assembly includes an upper joining post and a lower joining post, a top of the upper joining post is rotatably connected with the positioning seat, the upper joining post has a locating orifice, a bottom of the lower joining post is rotatably connected with the hanging frame, a bottom of the upper joining post is rotatably connected with a top of the lower joining post, and the lower joining post has an abutting portion extending curvedly outward from a top thereof;
wherein when the hanging frame is located at a hanging position, the hanging protrusion of the positioning seat is received in the locating orifice of the respective one connection assembly, and the abutting portion abuts against the upper joining post; when the hanging frame is located at a storage position, the accommodation protrusion of the positioning seat is received in the locating orifice of the respective one connection assembly.

2. The bicycle rack as claimed in claim 1, wherein the fixing rod includes a top holder, a bottom holder, and a coupling post; the top holder is configured to be fixed on the wall, and the bottom holder is configured to be mounted on the wall and located under the top holder, wherein the coupling post is erected and is rotatably connected between the top holder and the bottom holder so as to be forced by an external force to rotate at an original position.

3. The bicycle rack as claimed in claim 2, wherein the coupling post has a through orifice passing therethrough; the positioning seat includes a body and a passing stem, the body has a receiving orifice passing therethrough, a hole passing through two sides thereof, and the two locating sets formed on two sides of the hole which passes through the body, wherein the hanging protrusion is located beside the hole, and the accommodation protrusion is located above the hole; wherein the passing stem passes through the hole of the body and the through orifice of the coupling post so as to connect the body and the coupling post.

4. The bicycle rack as claimed in claim 3, wherein a top of the upper joining post of the respective one connection assembly is rotatably connected with the passing stem of the positioning seat.

5. The bicycle rack as claimed in claim 2, wherein an end of the hanging frame is rotatably connected with an outer surface of a bottom of the coupling post of the fixing rod.

6. The bicycle rack as claimed in claim 1, wherein the hanging protrusion and the accommodation protrusion have an arcuate face.

7. The bicycle rack as claimed in claim 1, wherein the hanging protrusion and the accommodation protrusion are resilient.

8. The bicycle rack as claimed in claim 1 further comprising two resilient sheets, wherein an end of a respective one resilient sheet is connected on an inner wall of the upper joining post of the respective one connection assembly, and the other end of the upper joining post of the respective one connection assembly bends inward.

9. The bicycle rack as claimed in claim 1, wherein when the hanging frame is located at the hanging position, the hanging frame is horizontal; when the hanging frame is located at the storage position, the hanging frame is vertical.

10. The bicycle rack as claimed in claim 1, wherein the lower joining post has a defining orifice; and a respective one connection assembly includes a connector connected between a bottom of the upper joining post and the top of the lower joining post, and the connector has an expanding protrusion and a retracting protrusion; when the hanging frame is located at the hanging position, the expanding protrusion slides into the defining orifice so that the upper joining post and the lower joining post are limited and expand; when the hanging frame is located at the storage position, the retracting protrusion slides into the defining orifice, and the upper joining post and the lower joining post are limited and retract.

11. The bicycle rack as claimed in claim 10, wherein the expanding protrusion and the retracting protrusion have an arcuate face.

12. The bicycle rack as claimed in claim 10, wherein the expanding protrusion and the retracting protrusion are resilient.

* * * * *